(12) United States Patent
Nishitani et al.

(10) Patent No.: US 8,704,796 B2
(45) Date of Patent: Apr. 22, 2014

(54) TOUCH PANEL AND DISPLAY DEVICE

(75) Inventors: Shigeyuki Nishitani, Mobara (JP); Kouichi Anno, Mobara (JP)

(73) Assignees: Japan Display Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 286 days.

(21) Appl. No.: 13/091,422

(22) Filed: Apr. 21, 2011

(65) Prior Publication Data
US 2011/0261010 A1 Oct. 27, 2011

(30) Foreign Application Priority Data
Apr. 22, 2010 (JP) .................................. 2010-098419

(51) Int. Cl.
*G06F 3/045* (2006.01)
(52) U.S. Cl.
USPC ............................ 345/174; 345/173; 345/175
(58) Field of Classification Search
CPC ................... G06F 2203/04107; G06F 1/1656; G06F 2203/04111
See application file for complete search history.

(56) References Cited

U.S. PATENT DOCUMENTS

| 4,623,757 | A | * | 11/1986 | Marino | ....................... | 178/18.03 |
| 2002/0054006 | A1 | * | 5/2002 | Tsuyuki et al. | ................. | 345/87 |
| 2008/0252608 | A1 | * | 10/2008 | Geaghan | ....................... | 345/173 |
| 2008/0309635 | A1 | * | 12/2008 | Matsuo | ......................... | 345/173 |
| 2009/0025987 | A1 | * | 1/2009 | Perski et al. | ................ | 178/18.03 |
| 2010/0052700 | A1 | * | 3/2010 | Yano et al. | ..................... | 324/658 |
| 2010/0164900 | A1 | * | 7/2010 | Lin | ................ | 345/174 |
| 2011/0140720 | A1 | * | 6/2011 | Kurashima | .................... | 324/686 |

FOREIGN PATENT DOCUMENTS

JP 2008-310550 12/2008

* cited by examiner

*Primary Examiner* — Alexander S Beck
*Assistant Examiner* — Amen Bogale
(74) *Attorney, Agent, or Firm* — Antonelli, Terry, Stout & Kraus, LLP.

(57) ABSTRACT

Provided is an electrostatic capacitance type touch panel in which lead lines are alternately connected to one end portions of a plurality of Y electrodes, the respective lead lines are formed outside an effective touch region, and are connected to terminals which are formed corresponding to the respective lead lines, inspection pads which are connected with the Y electrodes respectively are formed over end portions of the respective Y electrodes on a side where the lead lines are not connected to the respective Y electrodes, the plurality of inspection pads are formed in a region where the lead lines are formed outside the effective touch region, a shield electrode is provided between the lead lines and the respective inspection pads, and a voltage equal to a drive voltage supplied to the Y electrodes is supplied to the shield electrode.

6 Claims, 9 Drawing Sheets

TOUCH PANEL AND DISPLAY DEVICE

The present application claims priority from Japanese application JP 2010-098419 filed on Apr. 22, 2010, the content of which is hereby incorporated by reference into this application.

BACKGROUND OF THE INVENTION

1. Field of the Invention

The present invention relates to a touch panel and a display device, and more particularly to a technique which is effectively applicable in narrowing a width of a picture frame region outside an effective touch region.

2. Description of the Related Art

A display device which is provided with a device for inputting information with a touch operation using a finger of a user or a pen (contact pushing operation, hereinafter simply referred to as "touch") on a display screen (hereinafter also referred to as a touch sensor or a touch panel) is used in a mobile electronic device such as a PDA or a portable terminal, various household appliances, an automated teller machine and the like.

As such a touch panel, a resistance-film type touch panel in which a change in a resistance value of a touched portion is detected, an electrostatic-capacitance type touch panel in which a change in capacitance is detected, an optical-sensor type touch panel in which a change in quantity of light is detected and the like are known.

The electrostatic-capacitance type touch panel has the following advantages compared with the resistance-film type touch panel and the optical-sensor type touch panel. For example, the electrostatic-capacitance type touch panel is advantageous with respect to a point that transmissivity is high, that is, approximately 90% thus preventing the lowering of quality of a display image compared to the resistance-film type touch panel and the optical-sensor type touch panel where transmissivity is low, that is, approximately 80%. Further, although the resistance-film type touch panel detects a touch position in response to a mechanical contact with a resistance film and hence, there exists a possibility that the resistance film is deteriorated or broken, there is no mechanical contact which brings an electrode for detection into contact with other electrode or the like in the electrostatic-capacitance type touch panel and hence, the electrostatic-capacitance type touch panel is advantageous also from a viewpoint of durability.

As the electrostatic-capacitance type touch panel, for example, there has been known a touch panel of this type disclosed in JP 2008-310550 A. In the touch panel of this type disclosed in the patent document, the touch panel is provided with electrodes arranged in the longitudinal direction for detection (hereinafter referred to as X electrodes) and electrodes arranged in the lateral direction for detection (hereinafter referred to as Y electrodes) which are arranged in a matrix array in two dimensional directions consisting of the longitudinal direction and the lateral direction, and an input processing part which detects a capacitance of each electrode. When a conductive body such as a finger is brought into contact with a surface of the touch panel, the capacitance of each electrode is increased and hence, the input processing part detects the increase of the capacitance, and calculates input coordinates based on a signal indicative of a change in capacitance detected by each electrode.

In the electrostatic-capacitance type touch panel disclosed in JP 2008-310550 A, lines are led out from one side of the Y electrodes (hereinafter these lines being referred to as lead lines), and the lead lines are connected to terminals which are connected to a flexible printed circuit board so that a drive voltage is supplied to the Y electrodes from one side of the Y electrodes. Hereinafter, the touch panel adopting such a method is referred to as a touch panel of one-sided feeding type.

In this touch panel of one-sided feeding type, to inspect a disconnection of the Y electrode or a disconnection of the lead line of the Y electrode, an inspection pad is arranged on the other side of the Y electrode.

Further, in this touch panel of one-sided feeding type, to make a width of a picture frame outside an effective touch region uniform on left and right sides and to minimize the width, it is desirable to lead out the lead lines alternately. However, to prevent an erroneous recognition of a touch position in the touch panel which is caused by capacitive coupling between a lead line arranged outside the effective touch region and the inspection pad, the lead lines are arranged in a region more outside the inspection pad.

Accordingly, the width of the picture frame is increased. On the other hand, the omission of the inspection pads for narrowing the picture frame gives rise to a drawback that the disconnection of the Y electrode or the lead line of the Y electrode cannot be inspected.

SUMMARY OF THE INVENTION

The present invention has been made to overcome the above-mentioned problems of the related art, and it is an object of the present invention to provide a technique which can narrow a width of a picture frame outside an effective touch region in a touch panel where inspection pads are arranged on the other side of electrodes for detection and electricity is supplied to the electrodes for detection from one side of the electrodes for detection.

The above-mentioned and other objects and novel technical features of the present invention will become apparent from the description of this specification and attached drawings.

To briefly explain the summery of representative inventions among the inventions described in this specification, there are as follows.

(1) According to one aspect of the present invention, there is provided an electrostatic capacitance type touch panel which includes: a substrate; a plurality of X electrodes which are formed over the substrate, the plurality of X electrodes extending in a second direction and being arranged in a first direction which intersects with the second direction; and a plurality of Y electrodes which are formed over the substrate, the plurality of Y electrodes extending in the first direction while intersecting with the X electrodes and being arranged in the second direction; a drive voltage being supplied to the plurality of Y electrodes from one side of the plurality of Y electrodes, wherein lead lines are alternately connected to one end portions of the plurality of Y electrodes respectively, the respective lead lines are formed outside an effective touch region, and are connected to terminals which are formed on one side of the substrate and are formed corresponding to the respective lead lines, inspection pads which are connected with the Y electrodes respectively are formed at end portions of the respective Y electrodes on a side where the lead lines are not connected to the respective Y electrodes, the plurality of inspection pads are formed in a region where the lead lines are formed outside the effective touch region, a shield electrode is provided between the lead lines and the respective inspection pads, and a voltage equal to the drive voltage supplied to the Y electrodes is supplied to the shield electrode.

(2) According to another aspect of the present invention, there is provided an electrostatic capacitance type touch panel which includes: a substrate, a plurality of X electrodes which are formed over the substrate, the plurality of X electrodes extending in a second direction and being arranged in a first direction which intersects with the second direction; and a plurality of Y electrodes which are formed over the substrate, the plurality of Y electrodes extending in the first direction while intersecting with the X electrodes and being arranged in the second direction; a drive voltage being supplied to the plurality of Y electrodes from one side of the plurality of Y electrodes, wherein lead lines are alternately connected to one end portions of the plurality of Y electrodes respectively, the respective lead lines are formed outside an effective touch region, and are connected to terminals which are formed on one side of the substrate and are formed corresponding to the respective lead lines, a plurality of inspection-use lead lines which are connected with the Y electrodes respectively are formed at end portions of the respective Y electrodes on a side where the lead lines are not connected to the respective Y electrodes, the plurality of inspection-use lead lines are connected with inspection pads which are formed on one side of the substrate and are formed corresponding to the respective inspection-use lead lines, the plurality of inspection-use lead lines are formed in a region where the lead lines are formed outside the effective touch region, a shield electrode is provided between the lead lines and the respective inspection-use lead lines, and a voltage equal to the drive voltage supplied to the Y electrodes is supplied to the shield electrode.

To briefly explain advantageous effects acquired by the representative inventions among the inventions described in this specification, it is as follows.

According to the present invention, in a touch panel where inspection pads are arranged on the other side of electrodes for detection and electricity is supplied to the electrodes for detection from one side of the electrodes for detection, a width of a picture frame outside an effective touch region can be narrowed.

DETAILED DESCRIPTION OF THE INVENTION

Embodiments of the present invention are explained in detail in conjunction with drawings hereinafter.

In all drawings for explaining the embodiments, parts having identical functions are given same symbols, and the repeated explanation of these parts is omitted. Further, the embodiments explained hereinafter are not used for limiting the interpretation of claims of the present invention.

[Embodiment 1]

Figure 1:
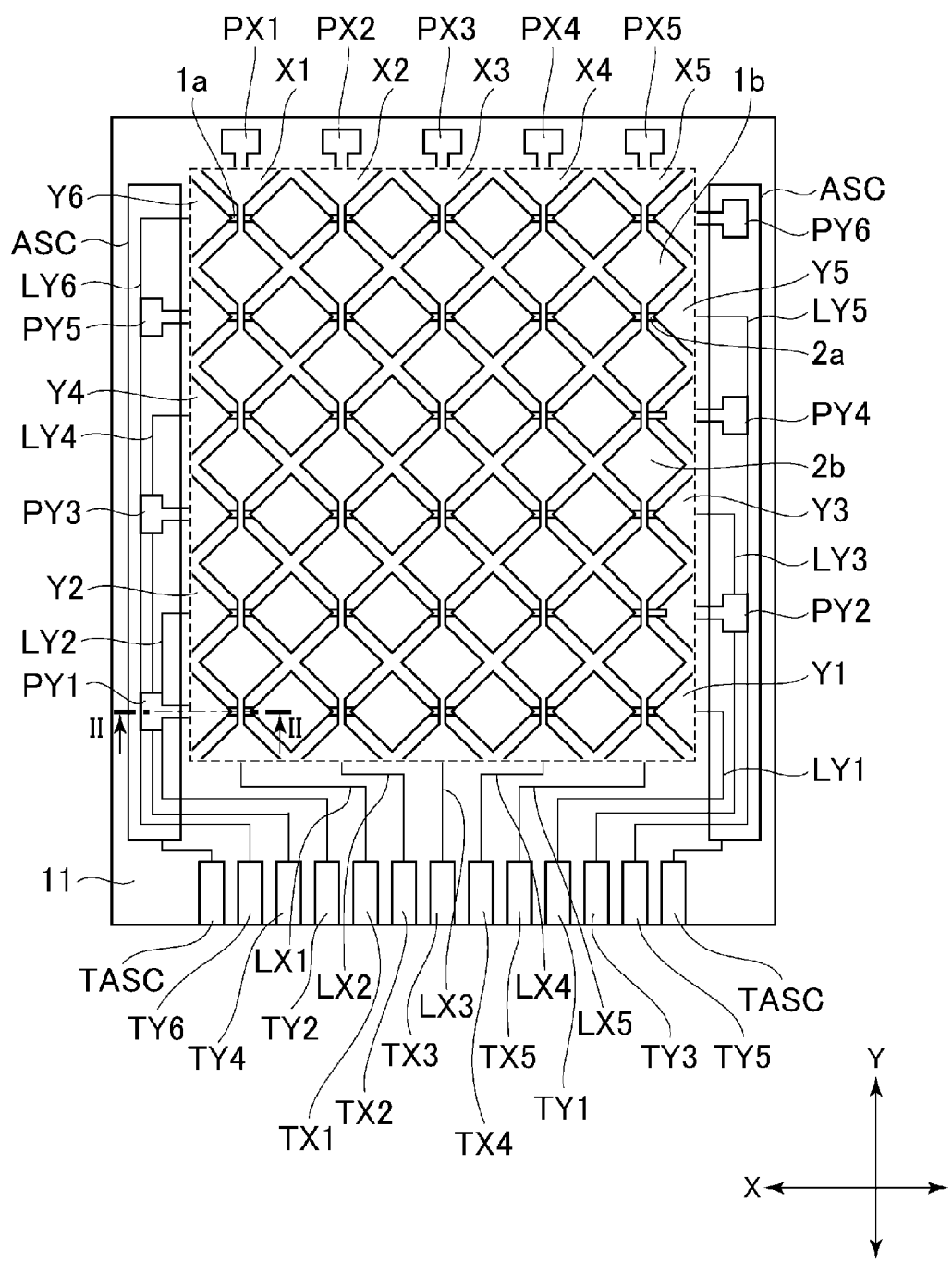
FIG. 1 is a view for explaining a touch panel according to an embodiment 1 of the present invention.
Figure 2:
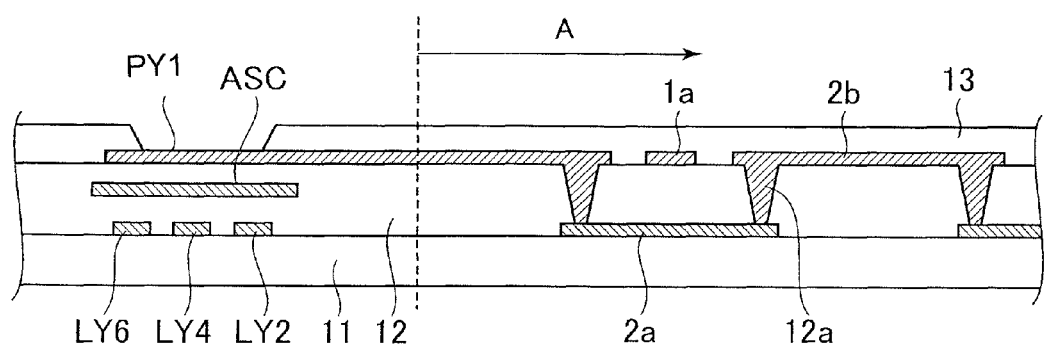
FIG. 2 is a cross-sectional view of an essential part showing the cross-sectional structure of the touch panel taken along a line II-II in FIG. 1.

FIG. 1 is a view for explaining a touch panel according to the embodiment 1 of the present invention, and FIG. 2 is a cross-sectional view of an essential part showing the cross-sectional structure of the touch panel taken along a line II-II in FIG. 1.

As shown in FIG. 1, the touch panel of this embodiment includes a plurality of X electrodes (X1 to X5) which extend in a second direction (Y direction) and are arranged parallel to each other in a first direction (X direction) which intersects with the second direction at a predetermined arrangement pitch, and a plurality of Y electrodes (Y1 to Y6) which extend in the first direction intersecting with the X electrodes and are arranged parallel to each other in the second direction at a predetermined arrangement pitch. A portion indicated by a dotted frame in FIG. 1 indicates an effective touch region.

Each one of the plurality of X electrodes has an electrode pattern in which a fine line portion 1a and a pad portion 1b having a width larger than a width of the fine line portion 1a are arranged alternately in the second direction.

As shown in FIG. 2, the plurality of X electrodes are arranged on an insulation film 12, and are covered with a protective film 13 which is formed over the plurality of X electrodes.

Each Y electrode has an electrode pattern in which a fine line portion 2a and a pad portion 2b having a width larger than a width of the fine line portion 2a are arranged alternately in the first direction.

As viewed in a plan view, the pad portion 1b of each X electrode and the pad portion 2b of each Y electrode are arranged without overlapping with each other, and the fine line portion 1a of each X electrode and the fine line portion 2a of each Y electrode intersect with each other.

As shown in FIG. 2, the respective fine line portions 2a of the plurality of Y electrodes are formed over a layer different from a layer over which the fine line portions 1a and the pad portions 1b of the X electrodes are formed, and the fine line portions 2a of the Y electrodes intersect with the fine line portions 1a of the X electrodes as viewed in a plan view. The respective pad portions 2b of the plurality of Y electrodes are formed over the same layer as the fine line portions 1a and the pad portions 1b of the X electrodes in a separated manner from the pad portions 1b of the X electrodes. In this embodiment, the fine line portions 1a of the X electrodes are formed above the fine line portions 2a of the Y electrodes.

In the same manner as the X electrodes, the respective pad portions 2b of the plurality of Y electrodes are covered with the protective film 13. Each one of the fine line portions 2a of the Y electrodes is formed over a substrate 11, and the fine line portion 2a of the Y electrode is electrically connected with two pad portions 2b arranged adjacent to each other with the fine line portion 2a sandwiched therebetween via a contact hole 12a formed in the insulation film 12. A transparent insulating substrate made of glass or the like, for example, is used as the substrate 11. The X electrodes and the Y electrodes are formed using a material which possesses high transmissivity, for example, a transparent conductive material such as ITO (Indium Tin Oxide), for example.

The touch panel of this embodiment is also a touch panel of a one-sided feeding type. As shown in FIG. 1, the X electrodes are constituted of five X electrodes X1 to X5, the respective X electrodes are connected to lead lines (LX1 to LX5), and the lead lines (LX1 to LX5) are connected to respective terminal portions (TX1 to TX5) formed on one side of the substrate 11.

The Y electrodes are constituted of six Y electrodes Y1 to Y6, one-end portions of the respective Y electrodes are connected to lead lines (LY1 to LY6), and the lead lines (LY1 to LY6) are connected to respective terminal portions (TY1 to TY6) formed on one side of the substrate 11. The lead lines (LY1 to LY6) of the Y electrodes are led out alternately to left and right sides. Further, the other end portions of the Y electrodes are respectively connected to inspection pads (PY1 to PY6) for inspecting an electrical conduction. The lead lines (LX1 to LX5, LY1 to LY6) are formed in a region outside the effective touch region (region indicated by an arrow A in FIG. 2), and are formed of a metal layer such as a silver alloy film.

In this embodiment, the inspection pads (PY1 to PY6) are arranged over the lead lines (LY1 to LY6) of the Y electrodes which are led out alternately on the left and right sides. As shown in FIG. 2, the inspection pad PY1 is arranged over the lead lines LY2, LY4 and LY6. An active shield electrode (ASC) is arranged between the inspection pads (PY1 to PY6) and the lead lines (LY1 to LY6) of the Y electrodes. In this manner, this embodiment adopts the structure where the active shield electrode (ASC) is sandwiched between the inspection pads (PY1 to PY6) and the lead lines (LY1 to LY6) of the Y electrodes.

In this embodiment, the inspection pads (PY1 to PY6) are formed over the same layer over which the fine line portions 1a and the pad portions 1b of the X electrodes and the pad portions 2b of the Y electrodes are formed, and the inspection pads (PY1 to PY6) are formed of a transparent conductive film such as ITO in the same manner as the X electrodes and the Y electrodes. Due to such a constitution, it is unnecessary to perform film forming or working to newly form inspection pads.

In the touch panel, to allow the detection of a change in capacitance of each electrode in response to a finger touch, it is necessary that the X electrodes and the Y electrodes are surely connected to the terminal portions formed on one side of the substrate by the respective lead lines. When a disconnection exists on any of the electrodes or in the midst of any of the lead lines, the detection of the change in capacitance in response to the finger touch cannot be detected.

Accordingly, in this embodiment, at the time of manufacturing a product, by inspecting the electrical conduction between the respective terminal portions (TY1 to TY6) and the respective inspection pads (PY1 to PY6), a touch panel in which a disconnection is found in the midst of the connection can be eliminated as a defective product thus realizing a touch panel which exhibits a high yield at the time of manufacturing.

In a usual operation time, a voltage equal to a drive voltage supplied to the Y electrodes (Y1 to Y6) is supplied to the active shield electrode (ASC). Accordingly, capacitive coupling between the inspection pads (PY1 to PY6) and the lead lines (LY1 to LY6) of the Y electrodes can be suppressed thus suppressing the capacitive coupling between the Y electrodes.

As a result, a touch panel which exhibits high accuracy in position determination can be realized in the same manner.

For example, although the inspection pad (PY5) which is arranged on the other end of the Y electrode Y5 is arranged over the lead line (LY6) of the Y electrode Y6, the active shield electrode (ASC) is arranged between the lead line (LY6) and the inspection pad (PY5) and hence, crosstalk generated due to the capacitive coupling between the Y electrode Y5 and the Y electrode Y6 can be suppressed. In the same manner, although the inspection pads (PY1 to PY6) of other Y electrodes are arranged on the lead lines (LY1 to LY6) of the respective Y electrodes, the active shield electrode (ASC) is arranged between the lead lines (LY1 to LY6) and the inspection pads (PY1 to PY6) and hence, crosstalk generated due to the capacitive coupling between the lead lines (LY1 to LY6) of the respective Y electrodes and other Y electrodes can be suppressed.

Assuming that a finger touch is made on the Y electrode Y6, a change in capacitance due to the finger touch occurs on the Y electrode Y6. A touch panel controller detects this change in capacitance, and determines that the finger touch is made on the Y electrode Y6.

In this case, assuming that crosstalk is generated between the Y electrode Y6 and the Y electrode Y5, the touch panel controller detects that capacitance over the Y electrode Y5 is slightly changed. Accordingly, the touch panel controller erroneously determines that the finger touch is made between the Y electrode Y5 and the Y electrode Y6.

In this manner, when crosstalk is generated, the touch panel controller determines a position deviated from a position at which the finger touch is originally made and hence, the accuracy in position determination is deteriorated.

In view of such circumstances, by adopting the structure where the active shield electrode (ASC) is sandwiched between the inspection pads (PY1 to PY6) and the lead lines (LY1 to LY6) of the Y electrodes, the above-mentioned crosstalk can be suppressed thus realizing a touch panel which exhibits high accuracy in position determination.

Further, the inspection pads (PY1 to PY6) are arranged on the originally necessary lead lines (LY1 to LY6) and hence, it is unnecessary to expand a picture frame region for the inspection pads (PY1 to PY6) whereby a touch panel with high design property can be realized.

Further, the active shield electrode (ASC) can be formed in the same step where the fine line portions 2a of the Y electrodes which constitute intersecting portions between the X electrodes and the Y electrodes are formed. By forming the active shield electrode (ASC) in this manner, it is unnecessary to form a new conductive film (for example, an ITO film) and hence, manufacturing steps can be simplified.

Next, a manufacturing method of the touch panel according to this embodiment is explained in conjunction with FIG. 1 and FIG. 2.

Firstly, a metal film (for example, a silver alloy film) is formed over a viewer-side surface of the substrate 11. A resist film is formed in a photolithography step, and the lead lines (LX1 to LX5) of the X electrodes and the lead lines (LY1 to LY6) of the Y electrodes are formed by patterning the alloy film.

Next, the lead lines (LX1 to LX5) of the X electrodes and the lead lines (LY1 to LY6) of the Y electrodes are covered with an insulation film, and a first conductive film made of a transparent conductive material (for example, ITO) is formed over the viewer-side surface of the substrate 11. A resist film is formed in a photolithography step, and the fine line portions 2a of the Y electrodes and the active shield electrode (ASC) are formed by patterning the first conductive film.

Then, the insulation film 12 which is formed of a negative resist, for example, is formed over the substrate 11 which includes the lead lines (LX1 to LX5) of the X electrodes, the lead lines (LY1 to LY6) of the Y electrodes, the fine line portions 2a of the Y electrodes and the active shield electrode (ASC).

Next, the contact holes 12a are formed on portions of the insulation film 12 where the contact holes 12a are necessary and, thereafter, a second conductive film made of a transparent conductive material (for example, ITO) is formed over the insulation film 12 including the inside of the contact holes 12a. A resist film is formed in a photolithography step, and the fine line portions 1a and the pad portions 1b of the X electrodes, the pad portions 2b of the Y electrodes, and the inspection pads (PY1 to PY6) are formed by patterning the second conductive film.

In this step, the pad portions 2b of the Y electrodes which constitute an upper layer are electrically connected with the fine line portions 2a of the Y electrodes which constitute a lower layer via the contact holes 12a. The fine line portions 1a of the X electrodes which constitute the upper layer and the fine line portions 2a of the Y electrodes which constitute the lower layer intersect with each other three-dimensionally.

Thereafter, the protective film 13 formed of a negative resist, for example, is formed over the insulation film 12 which includes the fine line portions 1a and the pad portions 1b of the X electrodes, the pad portions 2b of the Y electrodes and the inspection pads (PY1 to PY6) in such a manner that a portion of the inspection pads (PY1 to PY6) is exposed thus providing the structure shown in FIG. 1 and FIG. 2.

The lead lines (LX1 to LX5) of the X electrodes and the lead lines (LY1 to LY6) of the Y electrodes are connected to respective one-end portions of the X electrodes (X1 to X5) and the Y electrodes (Y1 to Y6) via through holes (not shown in the drawing) formed in the insulation film 12.

[Embodiment 2]

Figure 3:
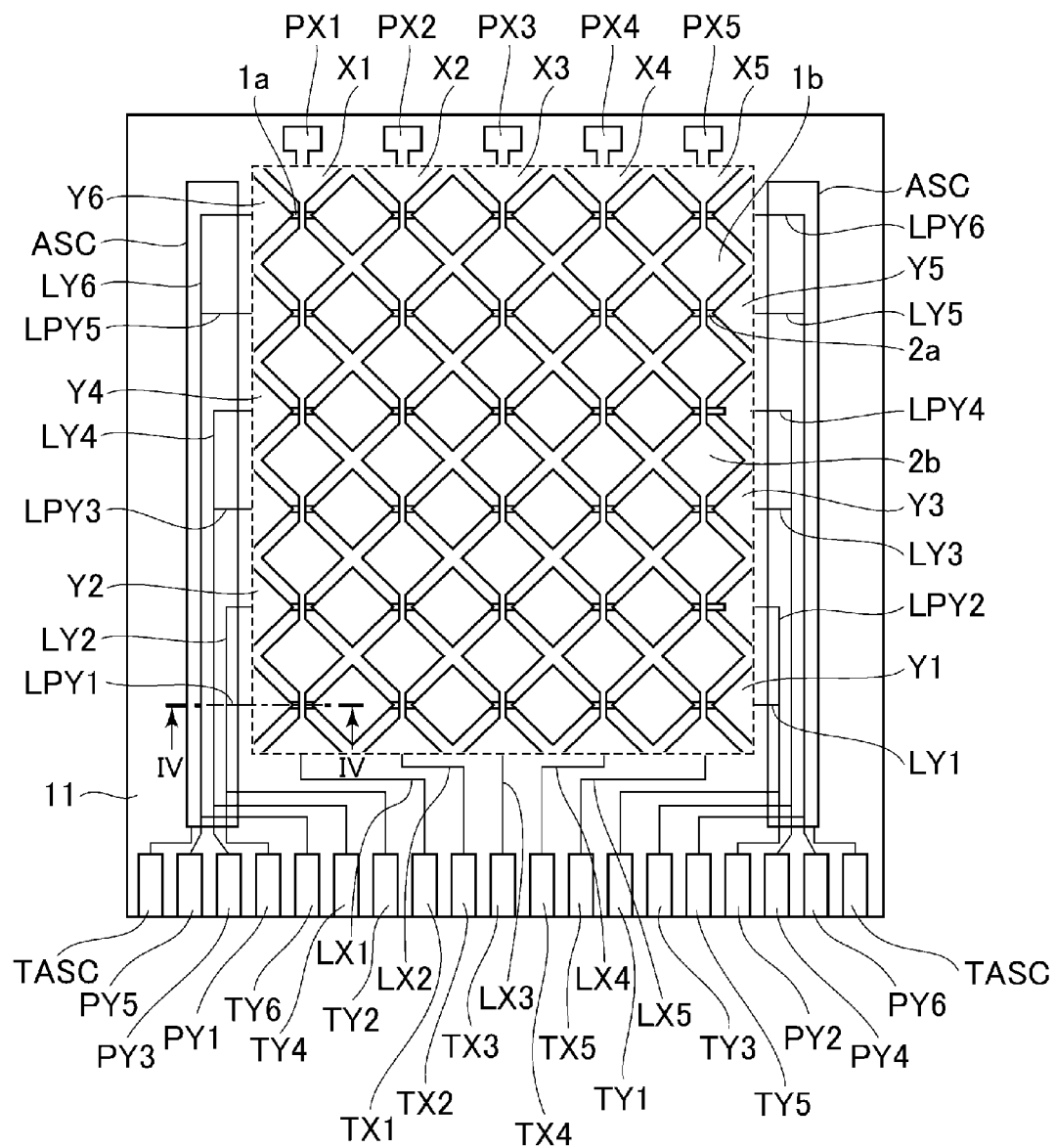
FIG. 3 is a view for explaining a touch panel according to an embodiment 2 of the present invention.
Figure 4:
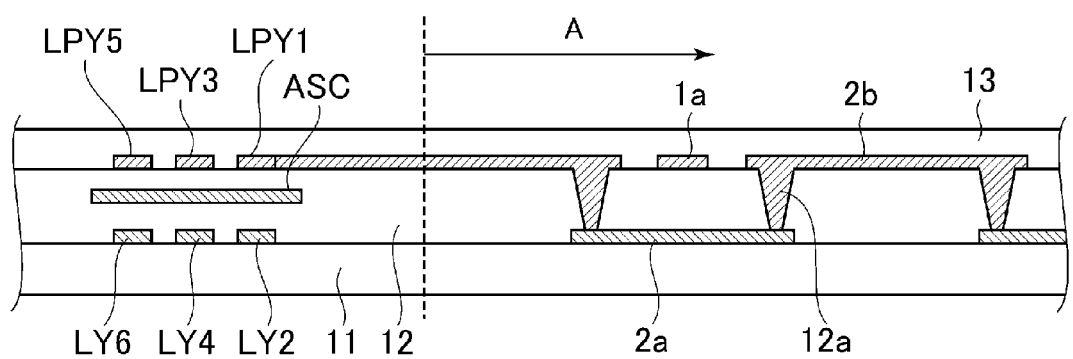
FIG. 4 is a cross-sectional view of an essential part showing the cross-sectional structure of the touch panel taken along a line IV-IV in FIG. 3.

FIG. 3 is a view for explaining a touch panel according to an embodiment 2 of the present invention, and FIG. 4 is a cross-sectional view of an essential part showing the cross-sectional structure of the touch panel taken along a line IV-IV in FIG. 3.

This embodiment is characterized in that inspection pads (PY1 to PY6) are formed outside terminal portions (TX1 to TX5, TY1 to TY6) formed on one side of a substrate where the terminal portions are formed, and inspection-use lead lines (LPY1 to LPY6) are connected between the inspection pads (PY1 to PY6) and the other end portions of Y electrodes.

The inspection-use lead lines (LPY1 to LPY6) are formed over the same layer over which fine line portions 1a and pad portions 1b of X electrodes and pad portions 2b of the Y electrodes are formed, and the inspection-use lead lines (LPY1 to LPY6) are formed of a transparent conductive film made of ITO or the like in the same manner as the X electrodes and the Y electrodes. Due to such a constitution, it is unnecessary to perform film forming or working to newly form the inspection pads.

Also in this embodiment, the inspection-use lead lines (LPY1 to LPY6) are arranged over an active shield electrode (ASC) thus constituting a two-layered wiring structure together with lead lines (LY1 to LY6) of the Y electrodes formed of a metal layer.

Accordingly, at the time of manufacturing a product, by inspecting an electrical conduction between the inspection pads (PY1 to PY6) and the terminal portions (TY1 to TY6) by making use of the inspection-use lead lines (LPY1 to LPY6), a touch panel in which a disconnection is found in the midst of the connection can be eliminated as a defective product thus realizing a touch panel which exhibits a high yield at the time of manufacturing.

In a usual operation time, a voltage the same as a drive voltage supplied to the Y electrodes (Y1 to Y6) is supplied to the active shield electrode (ASC). Accordingly, capacitive coupling between the inspection-use lead lines (LPY1 to LPY6) and the active shield electrode (ASC) can be suppressed thus suppressing the capacitive coupling between the Y electrodes. As a result, a touch panel which exhibits high accuracy in position determination can be realized in the same manner.

Further, by arranging the active shield electrode (ASC) between the inspection-use lead lines (LPY1 to LPY6) and the lead lines (LY1 to LY6) of the Y electrodes, the capacitive coupling between the Y electrodes can be suppressed. As a result, a touch panel which exhibits high accuracy in position determination can be realized in the same manner.

Further, by adopting such a structure, it is unnecessary to expand a picture frame region for the inspection pads (PY1 to PY6) and hence, a touch panel which exhibits high design property can be realized.

Further, the active shield electrode (ASC) can be formed in the same step where fine line portions 2a of the Y electrodes which constitute intersecting portions between the X electrodes and the Y electrodes are formed. By forming the active shield electrode (ASC) in this manner, it is unnecessary to newly form a conductive film (for example, an ITO film) and hence, manufacturing steps can be simplified.

In the respective embodiments described heretofore, the other end portions of the X electrodes are respectively connected to inspection pads (PX1 to PX5) which are provided for inspecting the electrical conduction.

Accordingly, in the above-mentioned respective embodiments, at the time of manufacturing a product, by inspecting the electrical conduction between the respective terminal portions (TX1 to TX5) and the respective inspection pads (PX1 to PX5), a touch panel in which a disconnection is found in the midst of the connection can be eliminated as a defective product thus realizing a touch panel which exhibits a high yield at the time of manufacturing. The inspection pads (PX1 to PX5) are formed of a transparent conductive film such as ITO in the same manner as the X electrodes and the Y electrodes.

[Touch Panel According to Modification of Embodiment 1 and Embodiment 2]

Figure 5:
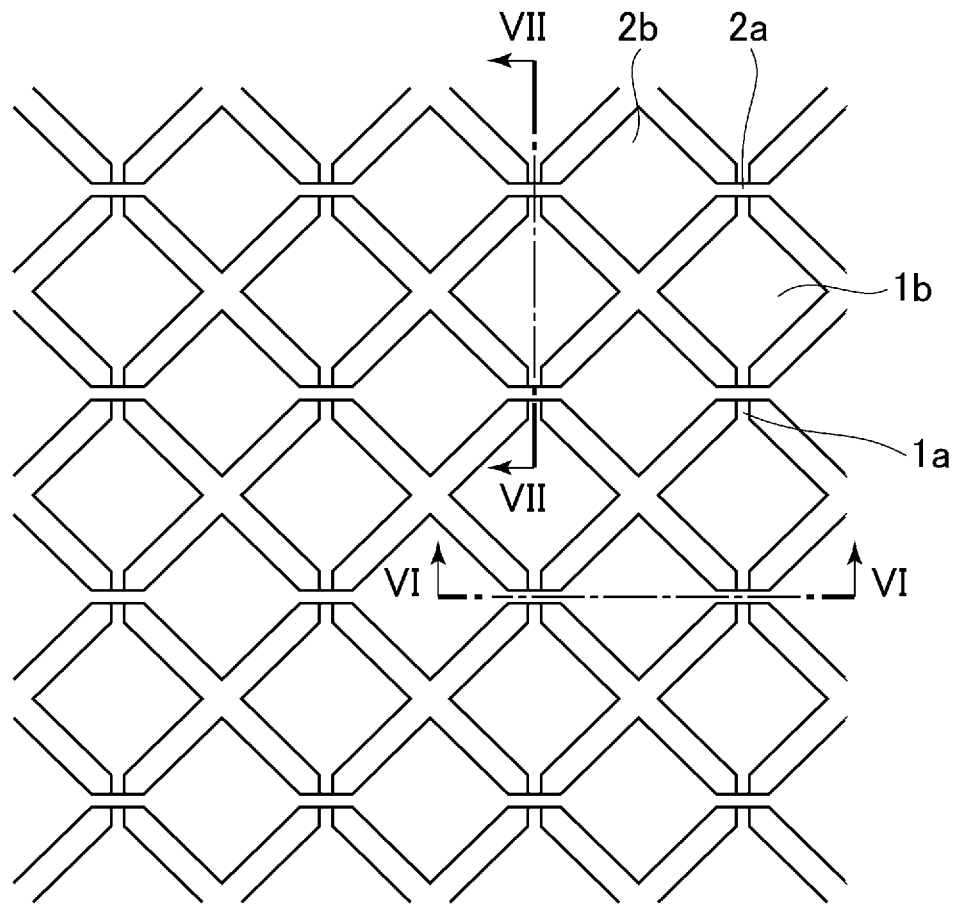
FIG. 5 is a view for explaining a touch panel according to a modification of the embodiment 1 and the embodiment 2 of the present invention.
Figure 6:
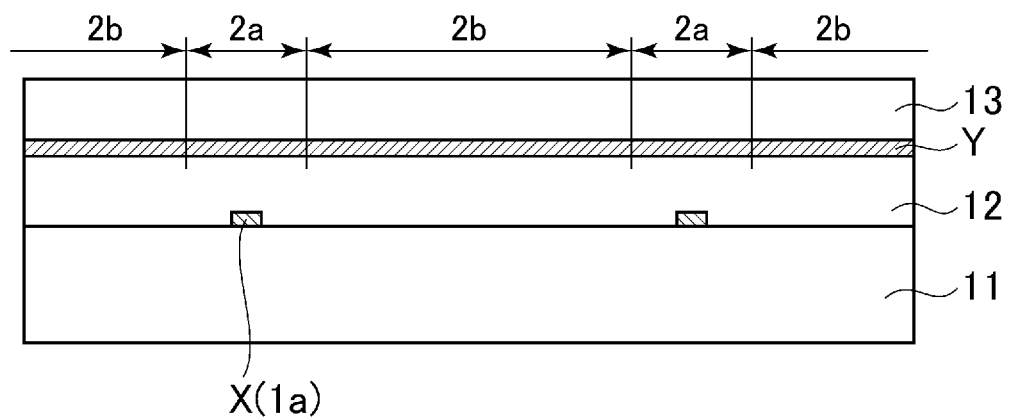
FIG. 6 is a cross-sectional view of an essential part showing the cross-sectional structure of the touch panel taken along a line VI-VI in FIG. 5.
Figure 7:
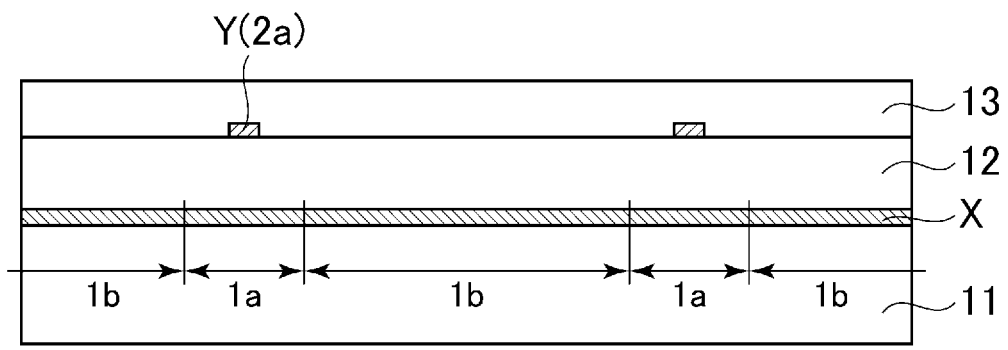
FIG. 7 is a cross-sectional view of an essential part showing the cross-sectional structure of the touch panel taken along a line VII-VII in FIG. 5.

FIG. 5 is a view for explaining a touch panel according to a modification of the embodiment 1 and the embodiment 2 of the present invention, FIG. 6 is a cross-sectional view of an essential part showing the cross-sectional structure of the touch panel taken along a line VI-VI in FIG. 5, and FIG. 7 is a cross-sectional view of an essential part showing the cross-sectional structure of the touch panel taken along a line VII-VII in FIG. 5.

Also in the touch panel shown in FIG. 5 to FIG. 7, as viewed in a plan view, pad portions 1b of respective X electrodes and pad portions 2b of respective Y electrodes are arranged without overlapping with each other, and fine line portions 1a of the respective X electrodes and fine line portions 2a of the respective Y electrodes intersect with each other.

The touch panel shown in FIG. 5 to FIG. 7 is characterized in that the X electrodes and the Y electrodes are formed over different layers with an insulation film 12 sandwiched therebetween as shown in FIG. 5 to FIG. 7, wherein the X electrodes are formed below the Y electrodes and, in the same manner as lead lines of the X electrodes and lead lines of the Y electrodes, the X electrodes are formed over a viewer's side surface of a glass substrate 11.

[Embodiment 3]

Figure 8:
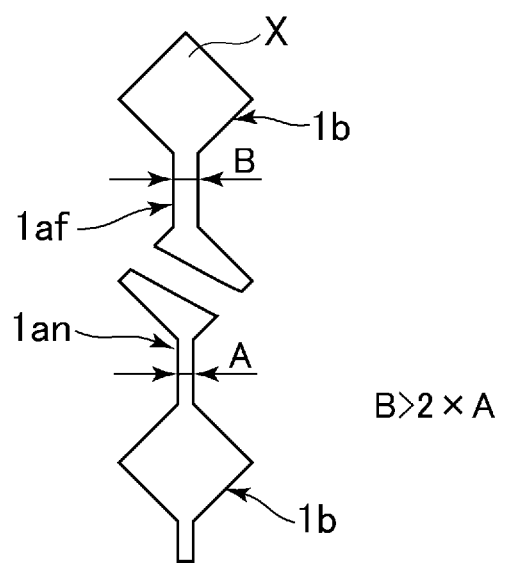
FIG. 8 is a view for explaining an X electrode of a touch panel according to an embodiment 3 of the present invention.

FIG. 8 is a view for explaining an X electrode of a touch panel according to an embodiment 3 of the present invention. This electrostatic-capacitance type touch panel determines presence or non-presence of a finger touch based on a change in capacitance of the X electrode or a Y electrode in response to the finger touch. Sensitivity in such an operation is influenced by capacitances and resistances of the X electrode and the Y electrode per se. That is, when the capacitances are large, it is impossible to grasp the change in capacitance when a user touches the touch panel. When the resistances are large, the electrodes (X electrode and Y electrode) cannot be charged sufficiently and hence, a response value for the finger touch becomes small so that sensitivity is lowered.

Further, when the reaction value in response to the finger touch fluctuates within an effective touch region, a region where sensitivity is insufficient is formed partially and such a region adversely influences a manipulation. Particularly, in a touch panel of a one-sided feeding type, a line length of electrodes which are arranged parallel to a long side of the touch panel (X electrodes in this embodiment) is large and hence, there may be a case where a load is increased at a remote end remote from a feeding end thus giving rise to the above-mentioned phenomenon.

In view of the above, according to this embodiment, to eliminate the difference in the reaction values in response to the finger touch between a near end and the remote end, by focusing on a fine line portion 1a which connects the electrodes and is largely relevant to a resistance value, as shown in FIG. 8, a width of the fine line portion 1a is increased along with the increase of a distance from the feeding end such that a width of a fine line portion 1af at the remotest end from the feeding end is set twice or more as large as a width of a fine line portion tan at the nearest end near the feeding end (B≥2×A in FIG. 8). Accordingly, the reaction value in response to the finger touch can be made uniform between a remote end side remote from the feeding end and a near end side near the feeding end.

In the above-mentioned embodiment, the width of the fine line portion 1a is increased along with the increase of the distance from the feeding end such that the width of the fine line portion 1af at the remotest end from the feeding end is set twice or more as large as the width of the fine line portion tan at the nearest end near the feeding end (B≥2×A in FIG. 8) with respect to the fine line portion 1a of the X electrode. However, also with respect to a fine line portion 2a of the Y electrode, a width of the fine line portion 2a may be increased along with the increase of a distance from a feeding end such that a width of the fine line portion 2a at the remotest end is set twice as large as a width of the fine line portion 2a at the nearest end near the feeding end.

[Embodiment 4]

Figure 9:
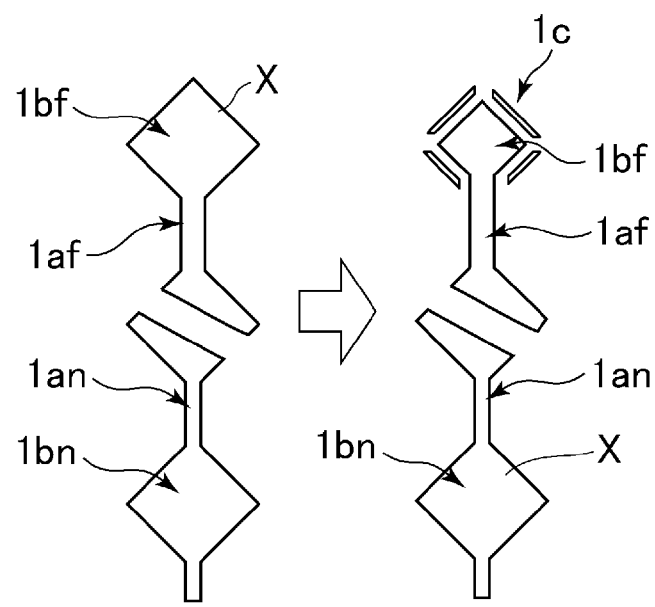
FIG. 9 is a view for explaining an X electrode of a touch panel according to an embodiment 4 of the present invention.

FIG. 9 is a view for explaining an X electrode of a touch panel according to an embodiment 4 of the present invention.

In this embodiment, as shown in FIG. 9, in the X electrode, compared to a size (or an area) of a pad portion 1bn on a near end side nearest to a feeding end, a size (or an area) of a pad portion 1bf on a remote end side remotest from the feeding end is set small, and floating electrodes 1c are added to the pad portion 1bf.

Due to such a constitution, a charge time can be shortened and an inter-electrode capacitance can be decreased and hence, a reaction value of the pad portion 1bf remotest from the feeding end in response to a touch on the X electrode can be enhanced.

In the above-mentioned embodiment, the size (or the area) of the pad portion 1bf on the remote end side from the feeding end is set small and the floating electrodes 1c are added to the pad portion 1bf with respect to the X electrode. However, a size (or an area) of a pad portion 2b on a remote end side remote from a feeding end may be set small and floating electrodes 1c maybe added to the pad portion 2b with respect to a Y electrode.

Although the size (or the area) of the pad portion 1b (or the pad portion 2b) on the remote end side remotest from the feeding end is set small and the floating electrodes 1c are added to the pad portion 1b (or the pad portion 2b) with respect to the X electrode (or the Y electrode) in this embodiment, a plurality of the pad portions 1b (or the pad portions 2b) on a remote end side remote from the feeding end may be set small and floating electrodes 1c may be added to the pad portions 1b (or the pad portions 2b) in the X electrode (or the Y electrode). In this case, the number of the pad portions 1b (or the pad portions 2b) whose size (or area) is decreased and to which the floating electrodes 1c are added may be set such that a reaction value in response to a finger touch can be made uniform in the X electrode (or the Y electrode). Further, sizes (or areas) of the pad portions 1b (or pad portions 2b) of the X electrode (or the Y electrode) may be gradually decreased along with the increase of a distance from the feeding end, and sizes (or areas) of the floating electrodes 1c may be gradually increased along with the increase of the distance from the feeding end.

Further, by adding the constitution of this embodiment to the constitution of the previously-mentioned embodiment 3, a reaction value of the pad portion 1bf remotest from the feeding end in response to a touch can be enhanced. FIG. 9 shows such a constitution.

[Embodiment 5]

Figure 10:
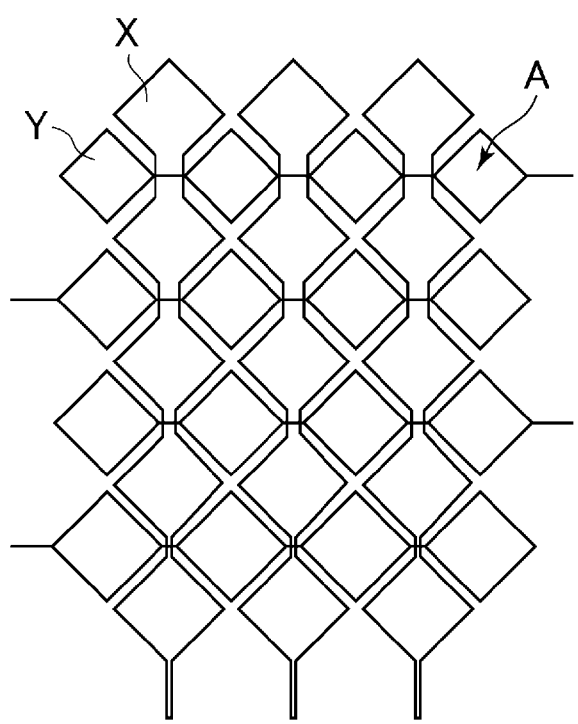
FIG. 10 is a view for explaining a drawback of the touch panel according to the embodiment 3 of the present invention.

In the electrode structure of the previously-mentioned embodiment 3, the width of the fine line portion 1a of the X electrode is increased along with the increase of the distance from the feeding end. Accordingly, as shown in FIG. 10, an area of the pad portion 2b of the Y electrode having the fine line portion 2a which intersects with the fine line portion 1a of the X electrode remotest from the feeding end is also decreased. FIG. 10 is a view for explaining a drawback of the touch panel according to the embodiment 3 of the present invention.

Figure 11:
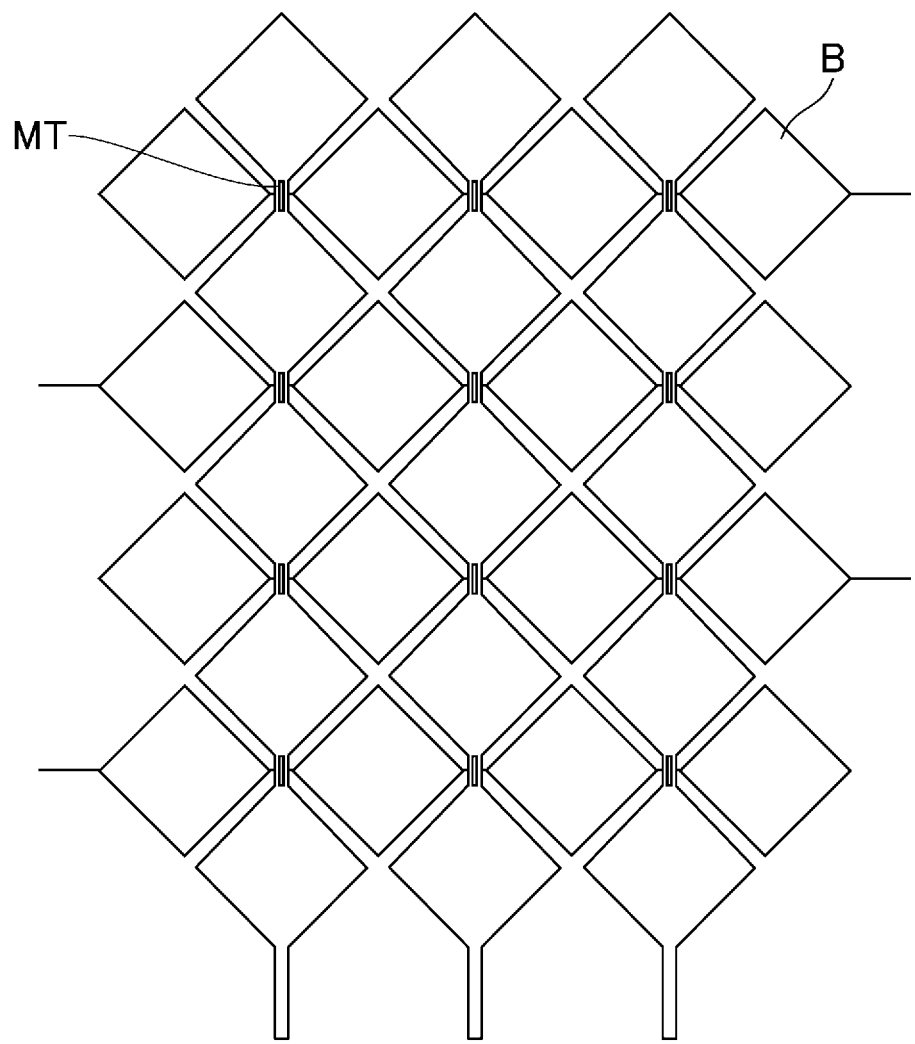
FIG. 11 is a view for explaining an X electrode of a touch panel according to an embodiment 5 of the present invention.

FIG. 11 is a view for explaining an X electrode of a touch panel according to an embodiment 5 of the present invention.

This embodiment is, as shown in a portion A of FIG. 11 in an enlarged manner, characterized in that the resistance of a fine line portion 1a of the X electrode remotest from a feeding end is lowered by laminating a metal layer MT to the fine line portion 1a. Due to such a constitution, compared to the previously-mentioned embodiment 3 shown in FIG. 8, a line width of the fine line portion 1a of the X electrode remotest from the feeding end can be made small and hence, it is possible to make the X electrodes and Y electrodes more difficult to be recognized by a user. Further, a size of the X electrode and a size of the Y electrode can be made uniform with each other and hence, linearity of the electrodes can be enhanced.

In the above-mentioned embodiment, although the resistance of the fine line portion 1a of the X electrode remotest from the feeding end is lowered by laminating the metal layer MT to the fine line portion 1a, the resistance of a fine line portion 2a of the Y electrode remotest from a feeding end may be lowered by laminating the metal layer MT to the fine line portion 2a.

In this embodiment, in place of lowering the resistance of the fine line portion 1a (or the fine line portion 2a) remotest from the feeding end by laminating the metal layer MT to the fine line portion 1a (or the fine line portion 2a) with respect to the X electrode (or the Y electrode), the resistance of the fine line portion 1a (or the fine line portion 2a) remotest from the feeding end may be lowered by increasing a film thickness of the fine line portion 1a (or the fine line portion 2a) remotest from the feeding end with respect to the X electrode (or the Y electrode). Also in this case, it is possible to make the X electrodes and the Y electrodes more difficult to be recognized by a user. Further, a size of the X electrode and a size of the Y electrode can be made uniform with each other and hence, linearity of the electrodes can be enhanced.

In FIG. 11, the metal layer MT is laminated to the fine line portion 1a (or the fine line portion 2a) remotest from the feeding end with respect to the X electrode (or the Y electrode). However, the metal layer MT may be laminated to a plurality of fine line portions 1a (or fine line portions 2a) on a remote end side remote from the feeding end in the X electrode (or the Y electrode). In this case, the number of the fine line portions 1a (or the fine line portions 2a) to which the metal layer MT is laminated may be set such that a size of the X electrode and a size of the Y electrode become uniform.

Further, this embodiment is also applicable to a usual touch panel, that is, a touch panel where fine line portions 1a (or fine line portions 2a) of X electrodes (or Y electrodes) have a uniform width.

[Embodiment 6]

Figure 12:
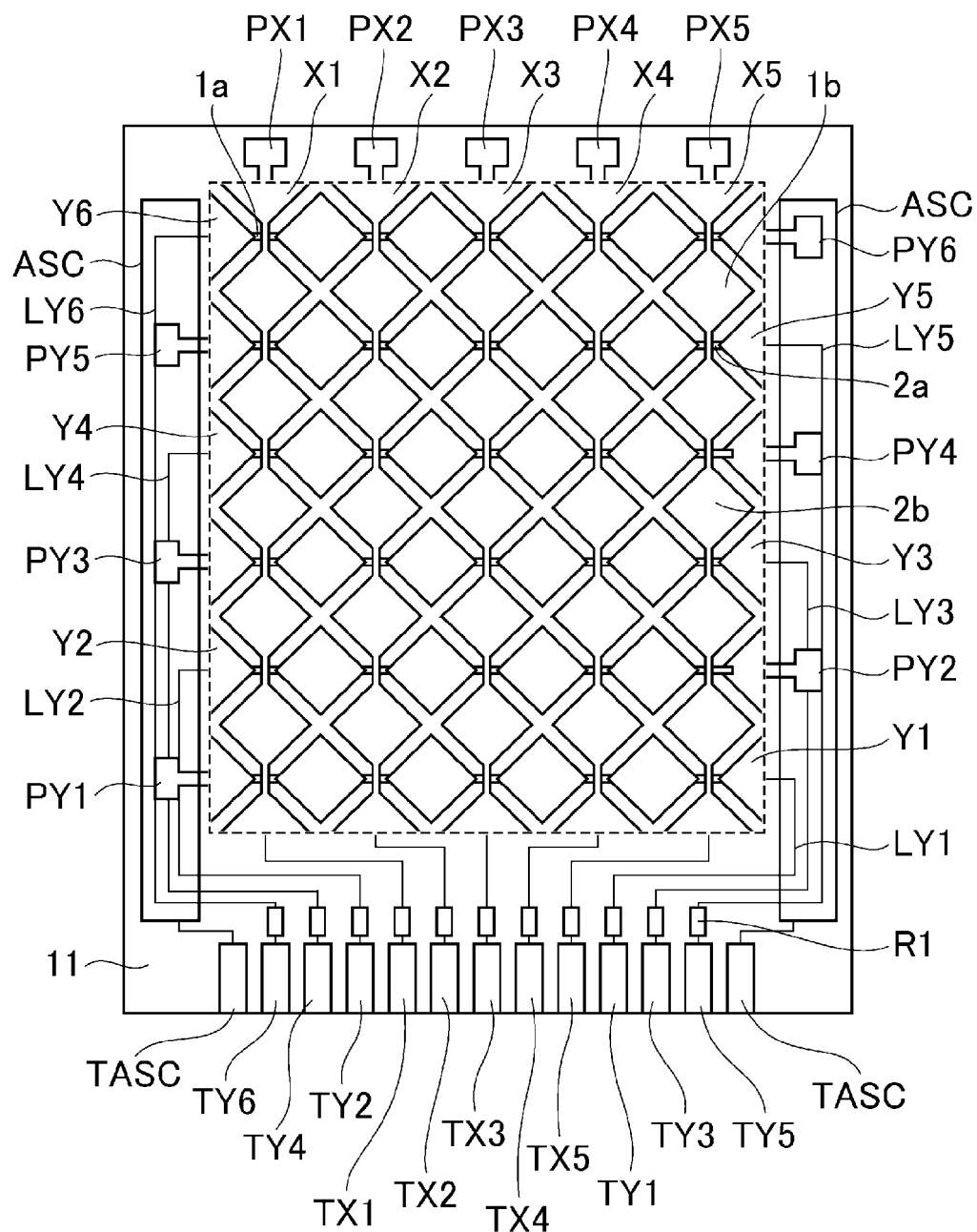
FIG. 12 is a view for explaining lead lines of a touch panel according to an embodiment 6 of the present invention.

FIG. 12 is a view for explaining lead lines of a touch panel according to an embodiment 6 of the present invention.

As shown in FIG. 12, this embodiment is characterized in that, lead lines (LX1 to LX5, LY1 to LY6) are connected to resistances (R1) of 100kΩ or more so as to prevent the appearance of irregularities in resistance value among X electrodes or irregularities in resistance value among Y electrodes within an effective touch region thus making a reaction value in response to a touch uniform within the effective touch region. Further, this embodiment can also cope with noises effectively.

In the touch panels of the above-mentioned embodiment 1 and embodiment 2, shapes of the pad portion 1b of the X electrode and the pad portion 2b of the Y electrode in a peripheral portion of the touch panel are set half of shapes of the pad portions in a center portion.

As described previously, one of causes which bring about the fluctuation of the reaction value in response to the finger touch is that the load is increased at the remote end remote from the feeding end. In this respect, in the touch panels of the embodiment 1 and the embodiment 2, the pad portions (1b, 2b) of the X electrode and the Y electrode remotest from the feeding end are set half of the pad portions in the center portion in shape and hence, the load is also halved approximately. Accordingly, the fine line portions (1a, 2a) or the pad portions (1b, 2b) to which the above-mentioned embodiments 3 to 5 are applied may be the fine line portions (1a, 2a) or the pad portions (1b, 2b) preceding to the fine line portions (1a, 2a) or the pad portions (1b, 2b) of the X electrode and the Y electrode remotest from the feeding end by one.

Further, the above-mentioned embodiments 3 to 6 are also applicable to a touch panel where the fine line portions 1a and the pad portions 1b of the plurality of X electrodes and the pad portions 2b of the plurality of Y electrodes are formed over the substrate 11, and the fine line portions 2a of the plurality of Y electrodes are formed over the insulation film 12.

As described previously, the touch panel of the above-mentioned each embodiment is arranged on a display panel of a liquid crystal display device or an organic EL display device, and is used as a device for inputting information by performing a touch operation on a display screen with a finger of a user, a pen or the like.

Although the inventions which are made by inventors of the present invention have been specifically explained in conjunction with the embodiments, it is needless to say that the present invention is not limited to the above-mentioned embodiments and various modifications are conceivable without departing from the gist of the present invention.

What is claimed is:

1. An electrostatic capacitance type touch panel comprising:
   a substrate;
   a plurality of X electrodes which are formed over the substrate, the plurality of X electrodes extending in a second direction and being arranged in a first direction which intersects with the second direction; and
   a plurality of Y electrodes which are formed over the substrate, the plurality of Y electrodes extending in the first direction while intersecting with the X electrodes and being arranged in the second direction; a drive voltage being supplied to the plurality of Y electrodes from one side of the plurality of Y electrodes, wherein
   lead lines are connected alternately to one and an other end portions of the plurality of Y electrodes at first and second sides of the substrate, respectively,
   the respective lead lines are formed outside an effective touch region, and are connected to terminals which are formed on a third side of the substrate and are formed corresponding to the respective lead lines,
   inspection pads which are connected with the Y electrodes are formed alternately at the one and the other end portions of the respective Y electrodes at the second and first sides of the substrate, respectively, on the side where the corresponding lead lines are not connected to the respective Y electrodes,
   at least one of the plurality of inspection pads is formed to overlap with at least two of the lead lines in a region where the lead lines are formed outside the effective touch region,
   a shield electrode is provided between the lead lines and the respective inspection pads, and
   a voltage equal to the drive voltage supplied to the Y electrodes is supplied to the shield electrode.

2. The touch panel according to claim 1, wherein the respective X electrodes, the respective Y electrodes, the respective inspection pads and the shield electrode are formed of a transparent conductive film, and
   the respective lead lines are formed of a metal layer.

3. The touch panel according to claim 1, wherein the respective X electrodes and the respective Y electrodes are formed by alternately arranging pad portions and fine line portions in an extending direction thereof respectively,
   the pad portions of the respective X electrodes and the pad portions of the respective Y electrodes are arranged without overlapping with each other as viewed in a plan view, and the fine line portions of the respective X electrodes and the fine line portions of the respective Y electrodes intersect with each other three-dimensionally,
   the pad portions and the fine line portions of the respective X electrodes and the pad portions of the respective Y electrodes are formed over the same layer, and
   the fine line portions of the respective Y electrodes are formed below the pad portions of the respective Y electrodes, and are connected to the pad portions of the respective Y electrodes via contact holes formed in an insulation film interposed between the pad portions of the respective Y electrodes and the fine line portions of the respective Y electrodes.

4. The touch panel according to claim 3, wherein the respective inspection pads are formed over the same layer over which the pad portions of the Y electrodes are formed, and the shield electrode is formed between the layer over which the pad portions of the Y electrodes are formed and a layer over which the fine line portions of the Y electrodes are formed.

5. The touch panel according to claim 1, wherein the respective X electrodes and the respective Y electrodes are formed by alternately arranging pad portions and fine line portions in an extending direction thereof, the pad portions of the respective X electrodes and the pad portions of the respective Y electrodes are arranged without overlapping with each other as viewed in a plan view, and the fine line portions of the respective X electrodes and the fine line portions of the respective Y electrodes intersect with each other three-dimensionally, and the X electrodes and the Y electrodes are formed over different layers with an insulation layer interposed therebetween, and the X electrodes are formed below the Y electrodes.

6. The touch panel according to claim 5, wherein the respective inspection pads are formed over the same layer over which the pad portions of the Y electrodes are formed, and the shield electrode is formed between the layer over which the Y electrodes are formed and the layer over which the X electrodes are formed.

* * * * *